No. 721,341. PATENTED FEB. 24, 1903.
S. STEWART.
SHADE FIXTURE.
APPLICATION FILED SEPT. 5, 1901. RENEWED AUG. 9, 1902.
NO MODEL.
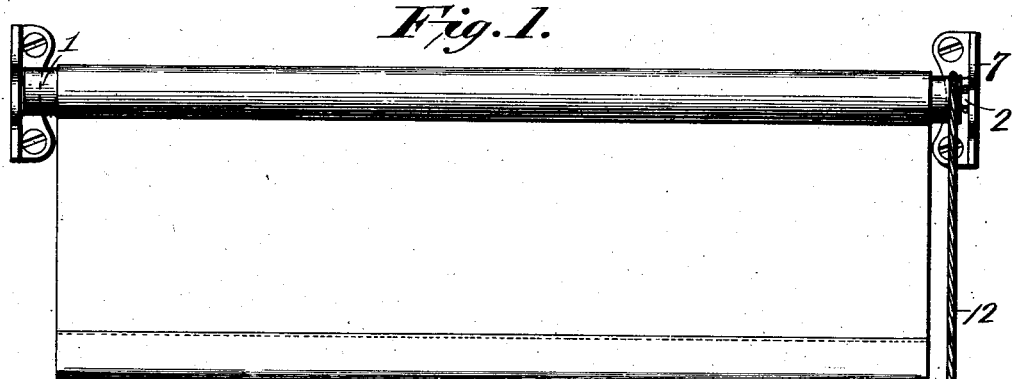
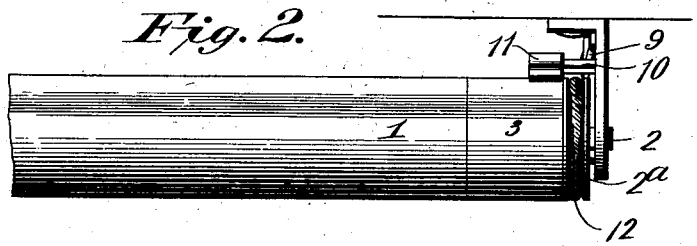
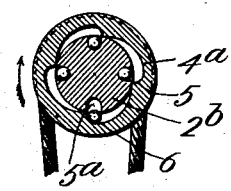
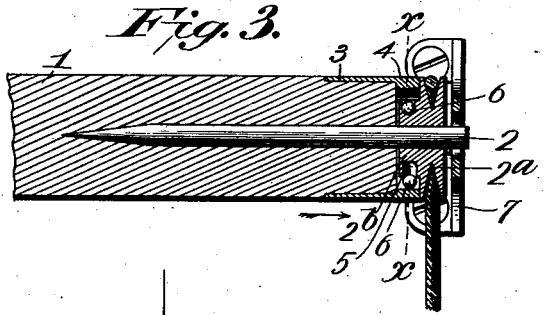
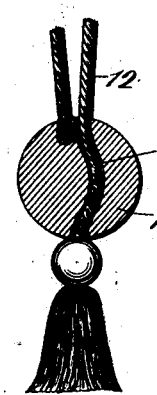
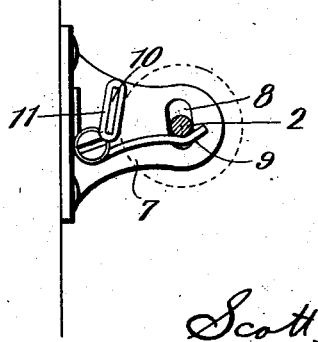
WITNESSES:
C. H. Walker
E. M. Lyons
INVENTOR
Scott Stewart
BY Frank S. Appleman
Attorney

UNITED STATES PATENT OFFICE.

SCOTT STEWART, OF RIEVESVILLE, WEST VIRGINIA.

SHADE-FIXTURE.

SPECIFICATION forming part of Letters Patent No. 721,341, dated February 24, 1903.

Application filed September 5, 1901. Renewed August 9, 1902. Serial No. 119,139. (No model.)

*To all whom it may concern:*

Be it known that I, SCOTT STEWART, a citizen of the United States of America, residing at Rievesville, in the county of Marion and State of West Virginia, have invented certain new and useful Improvements in Shade-Fixtures, of which the following is a specification.

This invention relates to curtain-shades, and particularly to that class designed for use in winding the shade on its roller and for holding the roller against retrograde movement except when a pull is made on the shade.

A further object of the invention is to provide novel means for retaining the roller and a flexible connection run over the pulley of the roller and, in combination therewith, means whereby the tension of the flexible connection is automatically regulated to exert sufficient friction to actuate the pulley and roller.

A still further object of the invention is to provide a flexible connection for rotating a shade-roller and in combination therewith a clutch slidable on the flexible connection, whereby the drag of the clutch is increased in proportion to the tension of the said flexible connection, said clutch descending by its gravity when tension on the connection is removed.

Furthermore, the object of the invention is to produce a shade-fixture in which the shade-roller is held at varying degrees of adjustment through the medium of a friction-brake and spring and means whereby a sufficient friction is automatically produced by a flexible connection passing over the roller to release the brake and rotate the roller.

A further object of the invention is to produce a shade-fixture having a brake in such relation to the bearing for the roller-spindle that such roller will be wedged between the brake and the bearing to increase the efficiency of the brake.

With the foregoing and other objects in view the invention consists in the details of construction and in the arrangement and combination of parts to be hereinafter more fully set forth and claimed.

In describing the invention in detail reference will be had to the accompanying drawings, forming a part of this specification, wherein like characters denote corresponding parts in the several views, and in which—

Figure 1 is a view in elevation of a shade and a fixture embodying the invention. Fig. 2 is a top plan view thereof. Fig. 3 is a vertical sectional view taken through one end of the roller. Fig. 4 is a sectional view taken on the line $x\,x$ of Fig. 3. Fig. 5 is a detail view of one of the brackets having the spring and brake.

In the drawings, 1 indicates the shade-roller, having a spindle 2. A metallic ferrule 3 is secured to one end of the roller and is provided with an inturned flange 4, said flange having in its inner edge a series of cam-surfaces $4^a$, each terminating in a shoulder 5 of sufficient depth at one end to engage balls 6 and tapering to the surface of the flange at the opposite end. A pulley is rotatable on the spindle 2 and has a hub $2^b$ extending within the flange 4, said hub being provided with a series of recesses $5^a$ of such area as to contain the balls 6. The said flange, balls, and hub form a ball-clutch by the balls 6 engaging the shoulders 5, which will cause the shade-roller to turn with the pulley when said pulley is rotated in the direction of the arrow, Fig. 4, but permitting the pulley to move free in the opposite direction owing to the balls being forced into the recesses of the hub by the cam-surfaces of the flange. The bracket 7 has an elongated and slightly-oblique bearing 8 for the reception of the spindle of the shade-roller, said spindle being held elevated through the action of the spring 9, on which it is supported. A lug 10 is carried by the bracket and preferably has a brake-surface 11, of leather or other suitable material, said lug having an inclination opposite to that of the spindle-bearing in order that the spring may tend to wedge the surface of the roller or the ferrule on its end against the brake to efficiently retain said roller. A flexible connection 12 is run over the pulley and has one end secured to the clutch 13 and the opposite end run through a curved opening 14 therein.

In operation the pull exerted on the end of the connection below the clutch tends to straighten the curved portion of connection, thereby producing a sufficient friction to depress the spring which holds the roller in contact with the brake and to turn the roller through the action of the ball-clutch carried by the roller and pulley. In this operation the friction exerted by the clutch 13 is proportional to the force required to depress the roller and turn it. When the flexible connection has been pulled a given distance and the roller is turned, the removal of tension on the connection will permit the roller to engage the brake and the clutch 13 to descend by its own weight for a repetition of the operation. When the shade is to be drawn down, a direct pull on the shade will depress the spring, and thereby remove the friction exerted by the brake and permit the shade to unwind.

Having thus fully described the invention, what I claim as new, and desire to secure by Letters Patent, is—

1. In a shade-fixture, a roller, a flexible connection for turning the roller, a clutch comprising a body on one end of the flexible connection having a hole therethrough, curved longitudinally, the said flexible connection passing over the roller and through the hole of the clutch-body, substantially as described.

2. In a curtain-fixture, a roller, a clutch member carried by the roller, a pulley, a second clutch member carried by the pulley, balls operating between the clutch members and a flexible connection operating over the pulley substantially as described.

In testimony whereof I affix my signature, in the presence of two witnesses, this 30th day of August, 1901.

SCOTT STEWART.

Witnesses:
J. ROSS COLHOUN,
HENRY T. BRIGHT.